United States Patent [19]

Schubart et al.

[11] Patent Number: 4,985,305

[45] Date of Patent: Jan. 15, 1991

[54] PROCESS FOR THE PREPARATION OF RUBBER/METAL COMPOSITE MATERIALS WITH A POWERFUL RUBBER/METAL BOND

[75] Inventors: Rüdiger Schubart, Bergisch Gladbach; Manfred Pieroth; Theo Kempermann, both of Cologne, all of Fed. Rep. of Germany

[73] Assignee: Bayer Aktiengesellschaft, Leverkusen-Bayerwerk, Fed. Rep. of Germany

[21] Appl. No.: 312,690

[22] Filed: Feb. 21, 1989

[30] Foreign Application Priority Data

Mar. 4, 1988 [DE] Fed. Rep. of Germany ....... 3807096

[51] Int. Cl.$^5$ .............................................. C08K 5/55
[52] U.S. Cl. .................... 428/389; 427/388.2; 428/389; 428/390; 428/462; 524/184; 524/185; 524/398
[58] Field of Search ............ 525/332.6, 337, 370; 524/183, 184, 185, 398; 428/390, 462, 389; 427/388.2

[56] References Cited

U.S. PATENT DOCUMENTS

| | | | |
|---|---|---|---|
| 1,902,005 | 3/1935 | Williams et al. | 524/183 |
| 2,259,175 | 10/1941 | Paul | 524/185 |
| 2,325,985 | 8/1943 | Semon | 524/183 |
| 2,894,020 | 7/1959 | McManimie | 524/183 |
| 2,909,560 | 10/1959 | McManimie | 524/183 |
| 3,514,370 | 5/1970 | Canevari | 524/398 |
| 3,600,351 | 8/1971 | Hunt et al. | 524/183 |
| 3,865,763 | 2/1975 | Feniak | 524/183 |
| 3,936,536 | 2/1976 | Brock | 428/389 |
| 4,214,058 | 7/1980 | Imamura et al. | 525/332.6 |
| 4,239,663 | 12/1980 | Ravagnani et al. | 525/370 |
| 4,244,842 | 1/1981 | Batzer et al. | 525/370 |
| 4,248,987 | 2/1981 | Maeda et al. | 525/370 |
| 4,283,460 | 8/1981 | Shemenski | 428/389 |
| 4,340,515 | 7/1982 | Frasser et al. | 524/274 |
| 4,376,838 | 3/1983 | Davis et al. | 524/183 |
| 4,550,147 | 10/1985 | Oohara | 525/332.6 |
| 4,684,421 | 8/1987 | Tate | 524/184 |

FOREIGN PATENT DOCUMENTS

| | | |
|---|---|---|
| 0065476 | 11/1982 | European Pat. Off. |
| 55-29520 | 3/1980 | Japan . |
| 0993045 | 5/1965 | United Kingdom . |
| 2022087 | 12/1979 | United Kingdom . |

OTHER PUBLICATIONS

Patent Abstracts of Japan, vol. 11, No. 379 (C-463)[2826], 12/10/87.
Database Chemical Abstracts, vol. 93 (4):27583z, 3/1/80.

*Primary Examiner*—Veronica P. Hoke
*Attorney, Agent, or Firm*—Connolly and Hutz

[57] ABSTRACT

The strength of the bond between a metal and vulcanized rubber may be increased by a bonding agent containing at least one organic cobalt compound and at least one boric acid ester.

7 Claims, No Drawings

PROCESS FOR THE PREPARATION OF RUBBER/METAL COMPOSITE MATERIALS WITH A POWERFUL RUBBER/METAL BOND

This invention relates to a process for the preparation of composite materials containing metal, based on vulcanized rubber, in particular metal-reinforce vulcanized rubber, with a powerful metal/vulcanizate bond, wherein the rubber is vulcanized in the presence of the metal and of a bonding agent containing at least one organic cobalt compound and at least one boric acid ester.

Many technological rubber articles such as pneumatic tyres, conveyor belts or high pressure hoses have reinforced steel linings which are frequently used in the form of steel cords.

High performance and long service life of such articles require a powerful, durable bond between the metal and the rubber.

The filaments of steel cord are normally coated, for the purpose of improving the metal/rubber bond, with zinc or with an alloy which comprises as its main components copper and zinc, preferably brass. A cord which has been treated in this manner may be incorporated directly into the vulcanizate during the vulcanization process, i.e. without the use of an adhesive.

Rubbers with a high sulphur content such as are conventionally used for example as bonding mixtures for the radial ply inserts of radial tyres attain good initial bonding values between the metal and rubber without additional bonding agents. The bond is improved further by the addition of bond promoting additives to the rubber used (FR-PS 1 323 934, DE-OS 1 720 144, 23 03 674, 24 47 853, 28 41 401 and 32 31 913, EP-A 3 820 9000 and US-PS 3 296 242 and 4 154 911). In composite materials based on vulcanized rubber, both with and without a bonding agent, the metal/rubber bond weakens considerably under the action of moisture and heat.

It is therefore an object of the present invention to provide a metal/rubber composite material which would not have the disadvantages described above or at least not to the extent previously encountered.

The present invention relates to a process for the preparation of a metal-containing composite material based on vulcanized rubber, in which the rubber is vulcanized in the presence of the metal and a bonding agent, characterised in that the bonding agent used comprises I. from 0.01 to 0.4% by weight, preferably from 0.02 to 0.2% by weight, of cobalt in the form of an organic cobalt compound and
II. from 0.1 to 6% by weight, preferably from C0.3 to 2.5% by weight, of boric acid ester, based in each case on the rubber.

The organic cobalt compounds I include for example cobalt complexes of β-dicarbonyl compounds preferably containing from 5 to 24 carbon atoms, especially β-diketones such as derivatives of acetyl acetone, of β-ketocarboxylic acids such as acylacetic acids and of 22-acylcycloalkanones, the following being specific examples:

Cobalt complexes of acetylacetone, O-acetoacetyl acetone oxime, O-acetoacetyl butanone oxime, benzoyl acetone, dibenzoyl methane, ethyl acetoacetate and the tert.-butyl ester, 1,3-dichloropropyl-2-ester, 2-chloropropyl-1-ester, cyclohexyl ester, isopropenyl ester, butane-2-y , n-dodecyl-thio-ester, phenyl ester and m-cresyl ester of acetoacetic acid, the ethyl ester of 4-chloroacetoacetic acid, the ethyl ester of methylene-bis-acetoacetic acid, the ethyl ester of 2-ethyl-acetoacetic acid the ethyl ester of 2-carbanilido-acetoacetic acid, N-acetoacetylamide, N-acetoacetylurea, N-propionyl-N'-acetoacetylthiourea, 2-acetyl-acetoacetic acid anilide, 2-acetyl-acetoacetic acid-p-toluidide, -piperidide and -benzylamide, and the ethyl ester of stearoyl acetic acid, the ethyla ester of 3[3-methylphenyl]- and of 3-[4-methylphenyl]-3ketopropionic acid, the diethyl ester and diallyl ester of 3-ketoglutaric acid, the diethyl ester of oxaloacetic acid, dimethylmalontae, the 1,7-diethyl ester of 2,4,6-trioxo-heptane dicarboxylic acid, the triethyl ester of methane tricarboxylic acid, 2-acetyl-cyclopentanone,-cyclohexanone, and -cyclododecanone, 2-propionyl-cyclopentanone and -cyclohexanone, 2-benzoylcyclohexanone, the methyl ester and ethyl ester of cyclopentanone-2-carboxylic acid, the methyl ester and ethyl ester of cyclohexanone-2-carboxylic acid, cyclopentanone-2-carboxylic acid-N-propylamide, cyclohexanone-2-carboxylic acid-N-propylamide, O-acetoacetyl-cyclohexanone oxime, the diethyl ester of cyclohexane-1,4-dione-2,5 -dicarboxylic acid, dehydroacetic acid, triacetic acid lactone and 2acetylindanone;

cobalt complexes of salicylic aldehyde and substituted salicylic aldehuyedes (DE-OS 3 100 570);

cobalt complexes of succinylo-succinic acid esters according to EP-A 3829;

cobalt salts of alkyl and arylsulphonic acids such as methane sulphonic acid, ethane sulphonic acid, benzene sulphonic acid and p-toluene sulphonic acid;

but preferably cobalt salts of linear, branched or cyclic saturated or unsaturated carboxylic acids, especially those with 2 to 24 carbon atoms and 1 to 4 carboxyl groups per molesule, such as acetic acid, 2-ethylhexane carboxylic acid, isodecane carboxylic acid, lauric acid, palmitic acid, stearic acid, linoleic acid, cyclohexane carboxylic acid, naphthenic acids, abietic acid and salicyclic acid.

The most preferred cobalt compound I is cobalt naphthenate.

The boric acid esters II preferably include boric acid esters having 1 or 2 boron atoms per molecule, namely boric acid esters of aliphatic, cycloaliphatic, araliphatic and aromatic alcohols preferably containing from 1 to 24 carbon atoms and preferably containing 1 to 6, most preferably 1 to 4 hydroxyl groups per molecule, e.g. boric acid esters of monohydric alcohols such as n-hexanol, 2-ethylhexanol, trimethylhexanol, n-octanol, n-decanol, n-dodecanol, palmitic alcohol, stearyl alcohol and mixtures of synthetically prepared $C_{12}$-$C_{18}$-alcohols, e.g. isomeric monohydric and dihydric alcohol mixtures prepared from dicyclopentadiene;

boric acid esters of unsaturated fatty alcohols such as allyl alcohol, oleyl alcohol, octadecenyl alcohol, natural mixtures of unsaturated $C_{12}$–$C_{22}$ alcohols; boric acid esters of acetylene alcohols such as propynol and 2-butynol;

cyclic boric acid esters of $C_2$–$C_{12}$–diols such as ethylene glycol, propanediol-(1,2) and -(1,3), neopentyl glycol and 2,2-diethylpropanediol-(1,3) and of substituted cyclic diols such as 1,1-dimethylol cyclopentane and dimethylolcyclohexane;

boric acid esters of glycidyl ethers such as nonyl glycidyl ethers;

cyclic boric acid esters of $C_3$–$C_{10}$–triols such as glycerol, trimethylolethane and trimethylolpropane;

boric acid esters of tetrahydric and higher hydric alcohols such as tetrahydroxybutane, monosaccharides such as pentoses and hexoses and disaccharides such as cane sugar;

boric acid esters of polyvinyl alcohol; boric acid esters of amino alcohols such as 2-dimethyl-aminoethanol and of aminodiols and triols such as 2-amino-propanediol-(1,3) and dipropanolamine, boric acid esters of acyclic compounds containing ether groups, such as 2-ethoxyethanol or 2-nonyloxyethanol, and cyclic compounds such as 5-ethyl-5-hydroxymethyl-dioxane-(1,3) and 2,2-di-(allyloxymethyl)-butanol-1;

boric acid esters of phenols or naphthols such as cresols, vinyl phenols, isopropenyl phenols, cyclohexyl phenols or e.g. pyrocatechol, any of which may be unsubstituted, monosubstituted or polysubstituted with $C_1$–$C_{10}$-alkyl, alkenyl, cycloalkyl, cycloalkenyl or phenyl; boric acid esters of mercapto alcohols such as 2-mercaptoethanol or 2-thioglycerol;

boric acid esters of alcohol- and/or phenol-mixtures of the above mentioned type;

boric acid esters of mono esters of α,ω-diols and mercaptocarboxylic acids such as 2-mercaptoacetic acid-2-hydroxy-ethyl ester and 3-mercaptopropionic acid-2hydroxyethyl ester.

Partially hydrolysed boric acid esters of the above type may also be used.

Boric acid esters II which correspond to the following formulae are particularly preferred:

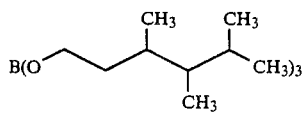

Compound 1

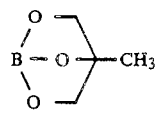

Compound 2

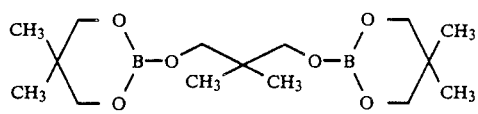

Compound 3

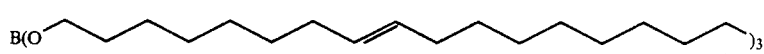

Compound 4

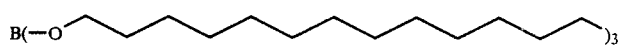

Compound 5

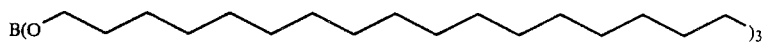

Compound 6

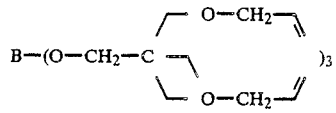

Compound 7

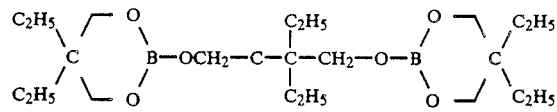

Compound 8

The boric acid esters II are either known or may be prepared by processes analyogous to those used for the preparation of the known boric acid esters; see Gmelin, Handbuch der Anorganischen Chemie, Vol.44, Supplement to the 8th Edition, Part 13, pages 105-108, published by Springer Verlag, Berlin,, Heidelberg, New York, 1977.

The cobalt compounds I are preferably free from built-in boron atoms and the boric acid esters II are preferably free from built-in cobalt atoms.

The ratio by weight of cobalt compound I to boric acid ester II may vary within the limits given in the Patent Claims. Excellent results are generally obtained with quantities corresponding to 0.1% by weight of cobalt and 1% by weight of boric acid ester, based on the rubber. If the strength of the bond rises above the desired level, the quantity of cobalt compound I may be reduced as required Thus in many cases it is sufficient to use amounts corresponding to 0.05% by weight of cobalt and 1% by weight of boric acid ester.

The rubbers which are preferred for the process according to the invention include natural rubber, polychloroprenes, ethylene/vinyl acetate copolymers, polybutadienes, styrenebutadiene copolymers, acrylonitrile/butadiene copolymers and their partial hydrogenation products and mixtures of the rubbers.

Rubbers suitable for the process according to the invention generally have Mooney viscosities (DIN 53 523, ML 1 +4) of from 10 to 150 ME, preferably from 25 to 80 ME.

Vulcanization may be carried out with any known vulcanizing agents, i.e peroxides or cross-linking phenol resins but especially sulphur and sulphur donors and the usual auxiliary agents. The vulcanization may be carried out at temperatures of from 100° to 280°C., preferably from 110° to 220°C.

The process according to the invention is not limited to composite materials with metallic reinforcing fibres but may be applied, for example, wherever relatively large metal surfaces such as sheet metals, pipes, etc. are to be coated with rubber.

EXAMPLES

The following rubber mixture was used in the examples given below:

| | |
|---|---|
| Natural rubber (SMR 5 Defo 700) | 100 parts by wt. |
| Carbon black N 326 | 43 parts by wt. |
| Carbon black N 539 | 20 parts by wt. |
| Colophony | 3 parts by wt. |
| Stearic acid | 1 part by wt. |
| Trimethyl dihydroquinoline ($^{(R)}$Vulkanox HS) | 1.5 parts by wt. |
| Zinc oxide | 10 parts by wt. |
| Sulphur | 7 parts by wt. |
| Benzothiazyl-2-dicyclohexyl-sulphenamide ($^{(R)}$Vulkacit DZ) | 0.7 parts by wt. |

The basic mixture, which was free from sulphur and accelerator, was premixed in a laboratory internal mixer at 50°C., the sulphur, accelerator and bonding agent were subsequently added to the laboratory mixing apparatus at a roller temperature of 40°C.

Test samples, measuring 20×15×6 mm, were prepared to test the bond by the T test method (see Bayer-Mitteilungen for die Gummi-Industrie, No.29, page 69).

Steel cord with a brass clad surface of the construction 7×3×(0.15 mm) was used.

Vulcanization was carried out at 150 °C., corresponding to the $t_{90}$-value. The bond strength and the degree of covering of the core was determined as important properties.

The bond values were determined at a test temperature of 80° C., using a tension testing apparatus at a draw-off rate from the clamp of 100 mm/min. The results are given in terms of the force (N) required for tearing the cord out of the rubber sample in the longitudinal direction. The degree of covering of the cord was assessed visually according to the following grading:
IV structural break in the rubber
III high degree of covering of the steel cord
II low degree of covering of the steel cord
I steel cord without covering.

At least four test samples of the same construction were used for each measurement and the average value was taken from the individual values.

EXAMPLE 1

The rubber contained cobalt naphthenate, which corresponded to a cobalt content of 0.1%, and 1% by weight of boric acid ester, based on the rubber.

For comparison, a bonding experiment was carried out with cobalt naphthenate alone, with a cobalt metal content of 0.1%, based on the rubber.

TABLE 1

| | Force [N] required for tearing out and degree of covering of the cord | | |
|---|---|---|---|
| | | Ageing | |
| Boric acid ester compound | Without ageing | 2 days steam 120° C. | 4 days steam 120° C. |
| —(Comparison) | 346 (IV) | 129 (I) | 116 (I) |
| 1 | 369 (IV) | 290 (II-III) | 207 (II-III) |
| 2 | 408 (IV) | 365 (IV) | 210 (II-IV) |
| 3 | 368 (IV) | 271 (IV) | 244 (IV) |
| 4 | 334 (IV) | 197 (II) | 168 (I) |
| 5 | 414 (IV) | 223 (II) | 154 (I) |
| 6 | 317 (IV) | 168 (I-II) | 128 (I-II) |
| 7 | 436 (IV) | 197 (II-IV) | 140 (II-IV) |

EXAMPLE 2

Example 2 shows that the usual dose of bonding agent based on cobalt conforming to the state of the art may be lowered by 50% by utilizing the compounds according to the invention without any loss of bonding properties.

TABLE 2

| | Tearing out force [N] and degree of covering of cord | | |
|---|---|---|---|
| Boric acid ester Compound % | Without ageing Co naphthenate % Co | Ageing | |
| | | 2 days steam 120° C. | 4 days steam 120° C. |
| (a) — | 0.1  346 (IV) | 129 (I) | 116 (I) |
| (b) 8     1 | 0.05 360 (IV) | 209 (II) | 134 (I) |

We claim:
1. A process for the preparation of a composite material based on vulcanized rubber and containing metal, in which the rubber is vulcanized in the presence of the metal and a bonding agent, characterized in that the bonding agent used comprises
  I. from 0.01 to 0.4% by weight of cobalt in the form of cobalt salts of linear, branched or cyclic saturated or unsaturated carboxylic acids having 2 to 24 carbon atoms and 1 to 4 carboxyl groups per molecule and
  II. from 0.1 to 6% by weight of boric acid ester, based in each case on the rubber, wherein the boric acid ester is

$$B(O-CH_2-CH(CH_3)-CH(CH_3)-CH(CH_3)-CH_3)_3,$$

$$\begin{array}{c} O \\ / \\ B-O \\ \backslash \\ O \end{array} \!\!\!\! \rangle\!\!-\!CH_3,$$

$$\begin{array}{c} CH_3 \\ CH_3 \end{array} \!\!\! \rangle\!\! \begin{array}{c} O \\ \backslash \\ / \\ O \end{array} \!\!\! B-O-CH_2-C(CH_3)_2-CH_2-O-B \begin{array}{c} O \\ \backslash \\ / \\ O \end{array} \!\!\! \langle \begin{array}{c} CH_3 \\ CH_3 \end{array},$$

$$B(O-(CH_2)_n-CH=CH-(CH_2)_m-CH_3)_3,$$

$$B(-O-(CH_2)_n-CH_3)_3,$$

$$B(O-(CH_2)_n-CH_3)_3,$$

-continued

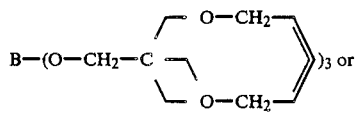

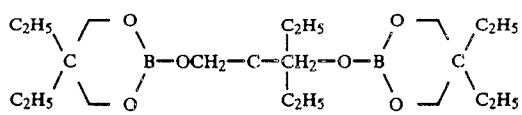

and wherein said rubber is a natural rubber, polychloroprene, ethylene/vinyl acetate copolymer, polybutadiene, styrene/butadiene copolymer, acrylonitrile/butadiene copolymer or a partially hydrogenated product thereof or a mixture thereof.

2. A process as claimed in claim 1, wherein the bonding agent comprises from 0.02 to 0.2% by weight of the cobalt compound I, based on the rubber.

3. A process as claimed in claim 1, wherein the bonding agent comprises from 0.3 to 2.5% by weight of boric acid ester II based on the rubber.

4. A process as claimed in claim 1 wherein the cobalt compound I is cobalt naphthenate.

5. A process as claimed in claim 2, wherein the bonding agent comprises from 0.3 to 2.5% by weight of boric acid ester II based on the rubber.

6. A process as claimed in claim 2 wherein the cobalt compound I is cobalt naphthenate.

7. A process as claimed in claim 3 wherein the cobalt compound I is cobalt naphthenate.

* * * * *